United States Patent [19]

Shibasaki

[11] Patent Number: 5,143,374
[45] Date of Patent: Sep. 1, 1992

[54] GOLF CLUB SHAFT AND PROCESS FOR MANUFACTURING SAME

[75] Inventor: Osamu Shibasaki, Utsunomiya, Japan

[73] Assignee: Somar Corporation, Japan

[21] Appl. No.: 655,914

[22] Filed: Feb. 15, 1991

[30] Foreign Application Priority Data

Feb. 16, 1990 [JP] Japan .................................. 2-35468

[51] Int. Cl.⁵ ............................................ A63B 53/10
[52] U.S. Cl. ........................... 273/80 B; 273/DIG. 7; 428/36.3; 428/34.6
[58] Field of Search ...... 273/80 B, DIG. 7, DIG. 23, 273/80 R; 428/36.1, 36.3, 36.91, 34.6, 113; 156/173, 189, 190; 43/18.1, 18.5

[56] References Cited

U.S. PATENT DOCUMENTS

| | | | |
|---|---|---|---|
| 2,783,173 | 2/1957 | Walker et al. | 273/DIG. 7 X |
| 3,313,541 | 4/1967 | Benkoczy et al. | 273/80 R |
| 3,646,610 | 2/1972 | Jackson | 273/80 R |
| 3,921,674 | 11/1975 | Logan et al. | 273/DIG. 7 X |
| 3,969,557 | 7/1976 | Jenks | 156/173 X |
| 3,974,012 | 10/1976 | Hogarth | 273/DIG. 7 X |
| 3,998,458 | 12/1976 | Inoue et al. | 273/80 R |
| 4,000,896 | 1/1977 | Lauraitis | 273/80 R |
| 4,043,074 | 8/1977 | Airhart | 273/DIG. 23 X |
| 4,082,277 | 4/1978 | Van Auken | 273/80 R |
| 4,084,819 | 4/1978 | Van Auken | 273/80 R |
| 4,097,626 | 6/1978 | Tennent | 273/DIG. 7 X |
| 4,131,701 | 12/1978 | Van Auken | 273/80 R X |
| 4,135,035 | 1/1979 | Branen et al. | 273/80 B X |
| 4,157,181 | 6/1979 | Cecka | 273/80 R |
| 4,214,932 | 7/1980 | Van Auken | 273/DIG. 7 X |
| 4,319,750 | 3/1982 | Roy | 273/80 B |
| 4,355,061 | 10/1982 | Zeigler | 156/189 X |
| 4,725,060 | 2/1988 | Iwanaga | 273/77 A |
| 4,757,997 | 7/1988 | Roy | 273/80 R |
| 4,830,377 | 5/1989 | Kobayashi | 273/186 A |
| 5,028,464 | 7/1991 | Shigetoh | 273/80 R |
| 5,049,422 | 9/1991 | Honma | 273/80 R |

FOREIGN PATENT DOCUMENTS

| | | | |
|---|---|---|---|
| 53-25122 | 8/1976 | Japan . | |
| 52-42098 | 10/1977 | Japan | 273/80 R |
| 0125140 | 11/1978 | Japan | 273/80 R |
| 5729374 | 7/1980 | Japan . | |
| 5759563 | 9/1980 | Japan . | |
| 63-147483 | 12/1986 | Japan . | |
| 2164482 | 7/1987 | Japan | 273/80 B |
| 1514966 | 6/1978 | United Kingdom | 273/80 R |
| 2053004 | 2/1981 | United Kingdom | 273/80 B |

Primary Examiner—William H. Grieb
Assistant Examiner—Sebastiano Passaniti
Attorney, Agent, or Firm—Lorusso & Loud

[57] ABSTRACT

A golf club shaft which includes a tubular inner layer formed of a first, fiber-reinforced plastic and containing a first fiber group wound at a first winding angle within the range of 20°–45° relative to the longitudinal shaft axis and an outer layer formed of a second, fiber-reinforced plastic and containing a second fiber group wound at a second winding angle within the range of 5°–30° relative to the longitudinal shaft axis, the outer layer being integrally bonded onto the outer surface of the inner layer, the first winding angle at any point in the longitudinal direction of the shaft being greater than the second winding angle at that point, the second winding angle being maximum at a point intermediate the length of the shaft and being smaller toward both ends of the shaft.

3 Claims, 3 Drawing Sheets

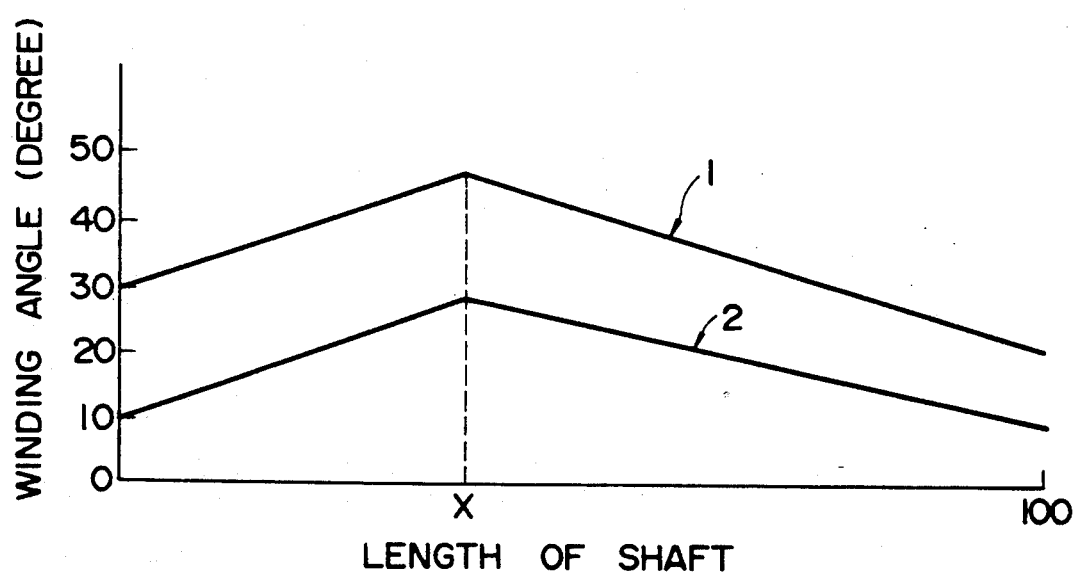
F I G. 3

GOLF CLUB SHAFT AND PROCESS FOR MANUFACTURING SAME

BACKGROUND OF THE INVENTION

The present invention relates to golf club shafts and a process for manufacturing same.

From the past, a fiber-reinforced hollow plastic golf club shaft (referred to hereinafter simply as the shaft) is known which has a structure such that an inner layer made of a wound-fiber-reinforced plastic and an outer layer formed thereon and made of a wound-fiber-reinforced plastics are bonded integrally.

In the prior art shaft having such a structure, it was ordinary that the orientation angle (absolute value, same in the following) of the wound-fibers was larger in the outer layer than in the inner layer and that in both layers the angle was gradually increased from the small diameter portion (the top end portion) toward the larger diameter portion (the grip portion). In the golf club shaft of such a structure, however, its kick point is determined to a fixed point depending on the length of the shaft and cannot be adjusted.

On the other hand, a method for adjusting the thickness of the resin in the intermediate portion (Patent Appln. No. Sho. 53-25122, Japanese Laid-open Patent Appln. No. Sho. 57-59563 and Japanese Laid-open Patent Appln. No. Sho. 63-147483) and a method for changing the outer diameter of the shaft rapidly or stepwise (Japanese Laid-open Patent Appln. No. Sho. 57-29374 and Japanese Laid-open Patent Appln. No. Sho. 63-147483) are known in order to adjust the kick point of the fiber-reinforced hollow plastic golf club shaft. However, these methods make the step for manufacturing the shaft complicated and so are not satisfactory as an industrial method. It is also possible to adjust the kick point to a certain degree by changing the fiber winding angle rapidly in an intermediate position. In this case, however, it is difficult to obtain a definite kick point, and moreover, there is a fear that the mechanical strength of the shaft is damaged as the fiber winding angle is rapidly changed.

SUMMARY OF THE INVENTION

It is an object of the present invention to provide a fiber-reinforced plastic golf club shaft devoid of drawbacks as seen in the prior art golf club shafts as well as a process for manufacturing same.

In accordance with one aspect of the present invention, there is provided a golf club shaft which comprises a tubular inner layer formed of a first, fiber-reinforced plastic and containing a first fiber group wound at a first winding angle within the range of 20–45° against the shaft axis and an outer layer formed of a second, fiber-reinforced plastic and containing a second fiber group wound at a second winding angle within the range of 5–30° against the shaft axis, the outer layer being integrally bonded onto the outer surface of the inner layer, the first winding angle at any point in the longitudinal direction of the shaft being greater than the second winding angle at that point, the second winding angle being maximum in an intermediate portion in the longitudinal direction of the shaft and being smaller toward both ends of the shaft.

In accordance with another aspect of the invention, there is provided a process for the manufacture of a hollow golf club shaft having a structure such that an inner layer made of a wound-fiber-reinforced plastic and an outer layer formed thereon and made of a wound-fiber-reinforced plastic are integrally bonded, characterized in that the winding angle of the wound fibers in the inner layer is maintained within the range of 20–45° against the axial direction of the shaft, while the winding angle of the wound fibers in the outer layer is maintained within the range of 5–30° against the axial direction of the shaft and smaller than the winding angle of the wound fibers in the inner layer and that the maximum point of the winding angle of the wound fibers in the outer layer is allowed to exist in an intermediate portion of the shaft while the winding angle of the fibers is decreased from the maximum point toward both ends of the shaft, to adjust the position of the maximum point on the shaft according to the given kick point.

BRIEF DESCRIPTION OF THE DRAWINGS

Other objects, features and advantages of the present invention will become apparent from the following description of the preferred embodiments with reference to the attached drawings.

In the drawings.

FIG. 2 and FIG. 3 show its modified examples; the line-1 and the line-2 show the relation between the orientation angle of the wound fibers and the length of the shaft in the inner layer and in the outer layer, respectively.

DETAILED DESCRIPTION OF THE PREFERRED EMBODIMENTS OF THE INVENTION

Figure 5:
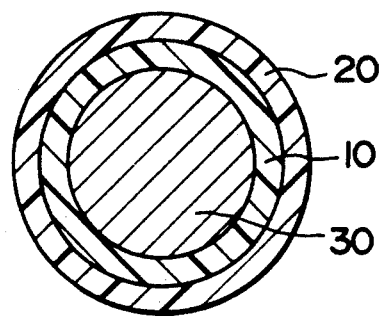
FIG. 5 is a cross-sectional view taken cut along V—V in FIG. 4(b).

The shaft of the present invention is manufactured by a known conventional filament winding method. As shown in FIG. 5, fibers impregnated with a resin are wound to a given thickness around a taper mandrel 30 to form an inner layer 10 and fibers impregnated with a resin are wound to a given thickness around the inner layer 10 to form an outer layer 20. It is then overlaid with a film and the whole is pressed and subjected to a heat treatment to cure the resin. After this heat treatment, the mandrel is removed and both ends of the layers are cut to have a given size and finally the surface is polished to become smooth.

Reinforcing fibers for use in the inner layer 10 and the outer layer 20 in this invention may be different but usually the same fibers are used.

Illustrative of the fibers used in the present invention are glass fibers, carbon fibers, Kevlar fibers, ceramic fibers and the like organic and inorganic fibers. The use of the carbonaceous fibers is preferable. The term "fibers" used in the present invention is intended to involve a tow formed of a multiplicity of filaments. Various kinds of thermohardenable binder resins are utilizable for the manufacture of prepreg, but the use of an epoxy resin is preferable.

Figure 4A:
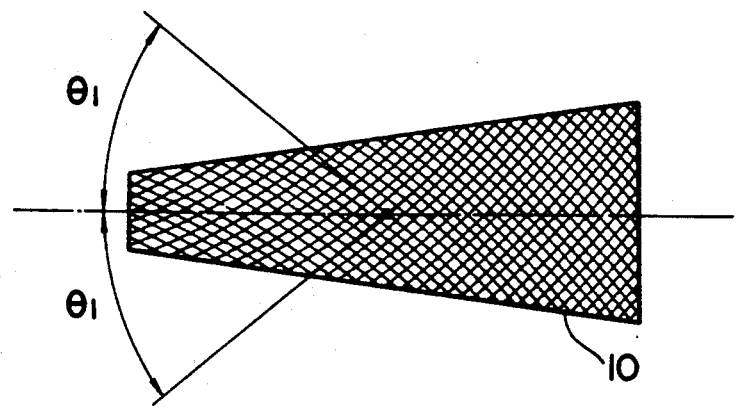
FIG. 4 (a) and (b) are schematically views of the inner layer and the outer layer at the time of manufacture.
Figure 4B:
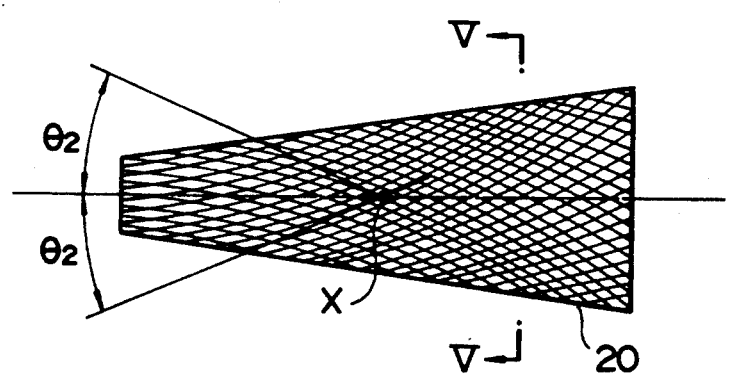

In FIGS. 4 (a) and 4 (b), the orientation angle (winding angle) $\theta_1$ of the wound fibers in the inner layer 10 is defined within the range of 20–45°, preferably 35–45° in the axial direction of the shaft in the present invention so as to facilitate the adjustment of the kick point. The winding angle $\theta_1$ of the wound fibers in the inner layer may be definite from the small diameter front end portion of the shaft to the large diameter grip end or may be decreased or increased or may have the maximum or minimum point in an intermediate portion. If the winding angle $\theta_1$ of the wound fibers in the inner layer is greater than 45°, the bending strength and the stiffness will be deteriorated. On the other hand, if the angle is smaller than 20°, it will result in a problem of increasing the twist angle and so is not preferable.

In the present invention, the orientation angle (winding angle) $\theta_2$ of the wound fibers in the outer layer 20 is defined within the range of 5–30°, preferably 5–25°, while being maintained smaller than the winding angle $\theta_1$ of the wound fibers in the inner layer. Further, the maximum point X of the fiber winding angle $\theta_2$ is allowed to exist in an intermediate portion of the shaft and the winding angle is allowed to decrease from the maximum point toward both end portions of the shaft. The kick point of the shaft can be adjusted by the position of the maximum point in the intermediate portion, and the kick point approaches to the grip side as the maximum point approaches to the grip side. If the winding angle $\theta_2$ of the wound fibers in the outer layer is greater than 30°, the bending strength and the stiffness will be deteriorated. On the other hand, if the angle $\theta_2$ is smaller then 5°, it will result in a problem of increasing the twist angle, and so is not preferable. The decreasing rate of the angle $\theta_2$ of the wound fibers in the outer layer from the maximum point is usually about 0.03–15°/1 cm.

On the formation of the inner layer 10 and the outer layer 20, the fibers impregnated with a resin are wound around the mandrel 30 while moving reciprocally in the longitudinal direction thereof. The orientation direction of the wound fibers in the outward and inward routes is inverted against the axis in each going and returning, but the absolute values of the winding angles $\theta_1$ and $\theta_2$ are within the range above defined.

Figure 1:
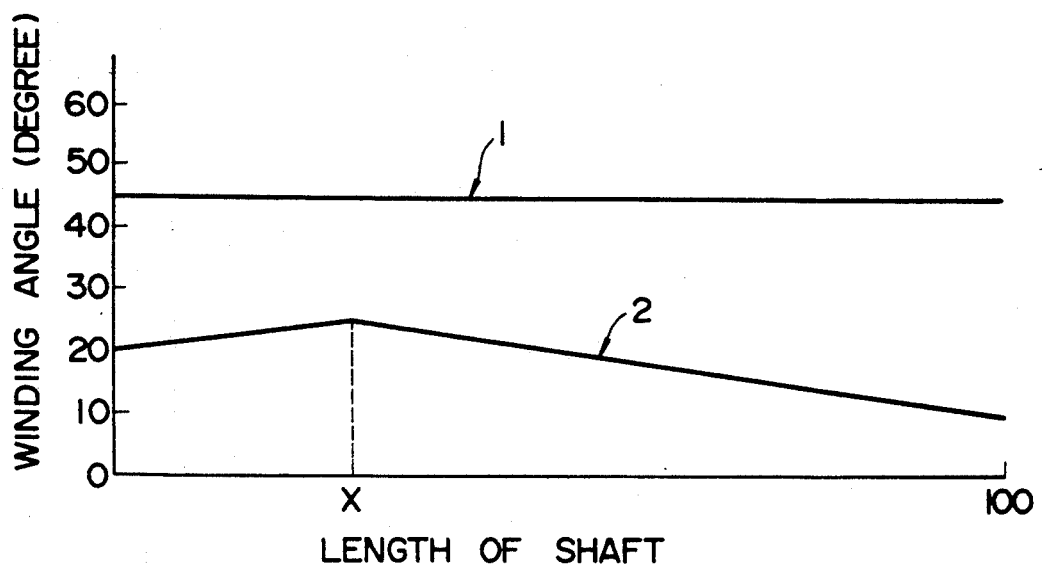
FIG. 1 is a graph showing the relation between the orientation angle of the wound fibers and the length of the shaft in one example of the fiber-reinforced hollow golf club shaft.
Figure 2:
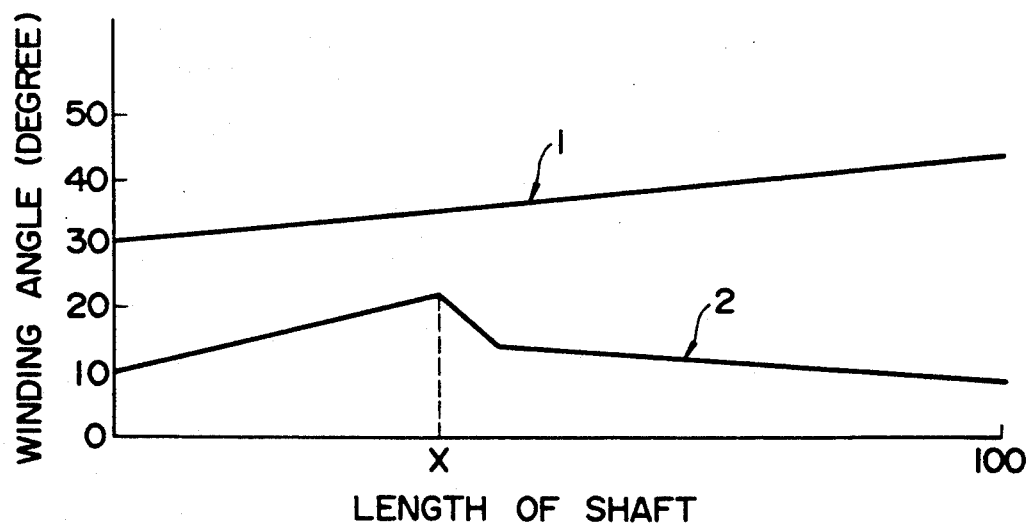

In FIGS. 1–3, the relation between the winding angles of the wound fibers in the inner and outer layers and the length of the shaft in one embodiment of this invention is shown as graphs. The line-1 stands for the relation between the winding angle ($\theta_1$) of the wound fibers in the inner layer and the length of the shaft while the line-2 for the relation between the winding angle ($\theta_2$) of the wound fibers in the outer layer and the length of the shaft. X stands for the point where the winding angle ($\theta_2$) of the wound fibers in the outer layer becomes maximum. The winding angle ($\theta_2$) of the wound fibers in the outer layer decreases from the maximum point toward both ends of the shaft, i.e. the small diameter front end portion (shaft length zero side) and the large diameter grip portion (shaft length 100 side).

In FIG. 1–3, the shaft length is shown as 100.

FIG. 1 shows an example wherein the winding angle ($\theta_1$) of the wound fibers in the inner layer is kept constant while the winding angle ($\theta_2$) of the wound fibers in the outer layer gives a maximum point and the orientation angle is decreased gradually from the maximum point toward both ends of the shaft.

FIG. 2 shows an example wherein the winding angle ($\theta_2$) of the wound fibers in the inner layer is gradually increased from the front end of the shaft toward the grip side while the winding angle ($\theta_2$) of the wound fibers in the outer layer gives a maximum point and is decreased gradually from the maximum point toward the front end portion of the shaft but is decreased once to a great degree from the maximum point toward the grip side and then decreased gradually.

FIG. 3 shows an example wherein the winding angle ($\theta_1$) of the wound fibers in the inner layer gives a maximum point almost in the same position (X) as the maximum point in the winding angle ($\theta_2$) of the wound fibers in the outer layer.

The position (X) on the shaft giving a maximum point is within the range of 20–60%, preferably 30–55% in terms of the ratio(X/L ×100) of the distance from the front end to the full length of the shaft. Its concrete value depends on the desired position of the kick point.

In the shaft of this invention, the thickness of the inner layer 10 is 0.3–2.4 mm, preferably 0.5–2.0 mm while that of the outer layer 20 is 0.3–2.5 mm, preferably 0.5–2.0 mm. The outer diameter of the front end of the shaft is about 7.0–9.5 mm and the outer diameter of the grip portion is about 14–16 mm. The full length of the shaft is about 900–1200 mm.

In the fiber-reinforced hollow golf club shaft of this invention, the kick point, i.e. the position of the portion where the shaft is curved at a minimum radius of curvature when the club head struck against a ball, is adjusted by the maximum point in the winding angle of the wound fibers in the outer layer. Accordingly, the manufacture of the shaft of this invention is easy, and the shaft wherein the kick point is adjusted can be obtained only by changing the winding angle on winding fibers impregnated with a resin around the mandrel according to the filament winding method. In addition, the shaft of this invention wherein the maximum point is allowed to exist in the winding angle of the wound fibers and the winding angle of the wound fibers is decreased from the maximum point as the boundary toward both end portions, is not especially deteriorated in mechanical strength.

The following examples will further illustrate the present invention.

EXAMPLE 1

High strength carbon fibers were impregnated with an epoxy resin and were wound around a cone-like metal mandrel having a length of 1200 mm, a larger diameter of 13 mm and a smaller diameter of 4 mm at a winding angle of 40° against the axial direction until the thickness of the wound thickness at the smaller diameter side became about 1 mm while reciprocating the fibers on the mandrel according to the filament winding method. In this case, the winding angle of the fibers in the outward route and the in the inward route was mutually inverted. High strength carbon fibers were impregnated with an epoxy resin and wound around the resultant layer such that the fibers were wound at a winding angle increasing continuously from 20° to 25° through a distance of 400 mm from the smaller diameter side and, after decreasing the winding angle from 25° to 10°, the fibers were wound at a winding angle decreasing from 10° to 5° from the distance at 400 mm to the larger diameter side while reciprocating the fibers on the mandrel according to the filament winding method until the thickness of the whole wound layers on the smaller diameter side became 4 mm. In this case, the winding angle of the fibers in the outward route and the inward route was mutually inverted. The wound layer was overlaid with a film and the whole was pressed and subjected to thermal curing in a curing furnace. After completion of the curing, the mandrel was removed and both ends were cut off to have the length of 1140 mm. The film was removed by polishing and the shaft was polished so as to obtain a given shaft hardness thereby manufacturing a carbon fiber-reinforced hollow plastic golf club shaft.

EXAMPLE 2

High strength carbon fibers were impregnated with an epoxy resin and were wound around a cone-like metal mandrel having a length of 1200 mm, a larger diameter of 13 mm and a smaller diameter of 4 mm at a winding angle of 40° against the axial direction until the thickness of the wound thickness at the smaller diameter side became about 1 mm while reciprocating the fibers on the mandrel according to the filament winding method. In this case, the winding angle of the fibers in the outward route and the in the inward route was mutually inverted. High strength carbon fibers were impregnated with an epoxy resin and wound around the resultant layer such that the fibers were wound at a winding angle increasing continuously from 20° to 25° through a distance of 500 mm from the smaller diameter side and, after decreasing the winding angle from 25° to 10°, the fibers were wound at a winding angle decreasing from 10° to 5° from the distance at 500 mm to the larger diameter side while reciprocating the fibers on the mandrel according to the filament winding method until the thickness of the whole wound layers on the smaller diameter side became 4 mm. In this case, the winding angle of the fibers in the outward route and the inward route was mutually inverted. The wound layer was overlaid with a film and the whole was pressed and subjected to thermal curing in a curing furnace. After completion of the curing, the mandrel was removed and both ends were cut off to have the length of 1140 mm. The shaft was polished so as to obtain the same shape as that in Example 1 thereby manufacturing a carbon fiber-reinforced hollow plastic golf club shaft.

EXAMPLE 3

High strength carbon fibers were impregnated with an epoxy resin and were wound around a cone-like metal mandrel having a length of 1200 mm, a larger diameter of 13 mm and a smaller diameter of 4 mm at a winding angle of 40° against the axial direction until the thickness of the wound thickness at the smaller diameter side became about 1 mm while reciprocating the fibers on the mandrel according to the filament winding method. In this case, the winding angle of the fibers in the outward route and the in the inward route was mutually inverted. High strength carbon fibers were impregnated with an epoxy resin and wound around the resultant layer such that the fibers were wound at a winding angle increasing continuously from 20° to 25° through a distance of 300 mm from the smaller diameter side and, after decreasing the winding angle from 25° to 10°, the fibers were wound at a winding angle decreasing from 10° to 5° from the distance at 300 mm to the larger diameter side while reciprocating the fibers on the mandrel according to the filament winding method until the thickness of the whole wound layers on the smaller diameter side became 4 mm. In this case, the winding angle of the fibers in the outward route and the inward route was mutually inverted. The wound layer was overlaid with a film and the whole was pressed and subjected to thermal curing in a curing furnace. After completion of the curing, the mandrel was removed and both ends were cut off to have the length of 1140 mm. The shaft was polished so as to obtain the same shape as that in Example 1 thereby manufacturing a carbon fiber-reinforced hollow plastic golf club shaft.

EXAMPLE 4

High strength carbon fibers were impregnated with an epoxy resin and were wound around a cone-like metal mandrel having a length of 1200 mm, a larger diameter of 13 mm and a smaller diameter of 4 mm at a winding angle increasing continuously from 40° to 45° through a distance of 400 mm from the smaller diameter side and then at a winding angle decreasing continuously from 45° to 30° from the distance at 400 mm to the larger diameter side. The winding was continued until the thickness of the wound thickness at the smaller diameter side became about 1 mm while reciprocating the fibers on the mandrel according to the filament winding method. In this case, the winding angle of the fibers in the outward route and the in the inward route was mutually inverted. High strength carbon fibers were impregnated with an epoxy resin and wound around the resultant layer such that the fibers were wound at a winding angle increasing continuously from 10° to 25° through a distance of 400 mm from the smaller diameter side and then at a winding angle decreasing from 25° to 8° from the distance at 400 mm to the larger diameter side while reciprocating the fibers on the mandrel according to the filament winding method until the thickness of the whole wound layers on the smaller diameter side became 4 mm. In this case, the winding angle of the fibers in the outward route and the inward route was mutually inverted. The wound layer was overlaid with a film and the whole was pressed and subjected to thermal curing in a curing furnace. After completion of the curing, the mandrel was removed and both ends were cut off to have the length of 1140 mm. The film was polished so as to obtain the same shape as that in Example 1 thereby manufacturing a carbon fiber-reinforced hollow plastic golf club shaft.

EXAMPLE 5

High strength carbon fibers were impregnated with an epoxy resin and were wound around a cone-like metal mandrel having a length of 1200 mm, a larger diameter of 13 mm and a smaller diameter of 4 mm at a winding angle continuously increasing from 30° at the small diameter side to 45° at the large diameter side against the axial direction until the thickness of the wound thickness at the smaller diameter side became about 1 mm while reciprocating the fibers on the mandrel according to the filament winding method. In this case, the winding angle of the fibers in the outward route and the in the inward route was mutually inverted. High strength carbon fibers were impregnated with an epoxy resin and wound around the resultant layer such that the fibers were wound at a winding angle increasing continuously from 12° to 20° through a distance of 400 mm from the smaller diameter side then at a winding angle continuously changing from 20° to 13° through about 5 mm and further at a winding angle decreasing from 13° to 10° from the distance at about 405 mm to the larger diameter side while reciprocating the fibers on the mandrel according to the filament winding method until the thickness of the whole wound layers on the smaller diameter side became 4 mm. In this case, the winding angle of the fibers in the outward route and the inward route was mutually inverted. The wound layer was overlaid with a film and the whole was pressed and subjected to thermal curing in a curing furnace. After completion of the curing, the mandrel was removed and both ends were cut off to have the length of 1140 mm. The film was removed by polishing and the shaft was polished so as to obtain the same shape as that in Example 1 thereby manufacturing a carbon fiber-reinforced hollow plastic golf club shaft.

The carbon fiber-reinforced hollow plastic golf club shafts thus obtained in the above examples were then measured for degree of deflection using a dial gauge while applying a load of 8 kg with two points of the shaft which are located at 25 cm inside from the both ends serving as fulcrums. The point at which the degree of deflection becomes maximum represents the kick point. The results are shown in Table 1.

TABLE 1

| Example | Degree of Deflection | Kick Point (distance from small diameter side) |
| --- | --- | --- |
| 1 | 45.6 mm | 460 mm |
| 2 | 46.2 mm | 500 mm |
| 3 | 45.7 mm | 400 mm |
| 4 | 44.3 mm | 440 mm |

TABLE 1-continued

| Example | Degree of Deflection | Kick Point (distance from small diameter side) |
| --- | --- | --- |
| 5 | 44.8 mm | 490 mm |

What is claimed is:

1. A golf club shaft having first and second opposing ends and having a tubular inner layer formed of a first, fiber-reinforced plastic and containing a first fiber group wound at a first winding angle within the range of 20–45° relative to the longitudinal shaft axis and an outer layer formed of a second, fiber-reinforced plastic and containing a second fiber group wound at a second winding angle within the range of 5–30° relative to the longitudinal shaft axis, said outer layer being integrally bonded onto the outer surface of said inner layer, the first winding angle at any point in the longitudinal direction of the shaft being greater than the second winding angle at that point, the second winding angle being maximum at an intermediate point located along an intermediate lengthwise portion of the shaft and decreasing toward both ends of the shaft.

2. A golf club shaft according to claim 1, wherein the shaft has an outer diameter gradually decreasing from said first end to said second end.

3. A golf club shaft according to claim 2, wherein said intermediate point is located at a position spaced apart from said second end a distance equal to 20–60% of the total length of the shaft.

* * * * *